Dec. 5, 1933.    W. S. HILKEY    1,938,425
VALVE
Filed Feb. 10, 1932
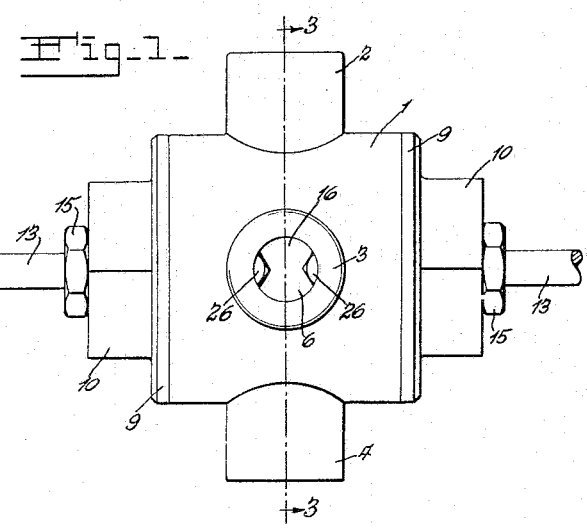
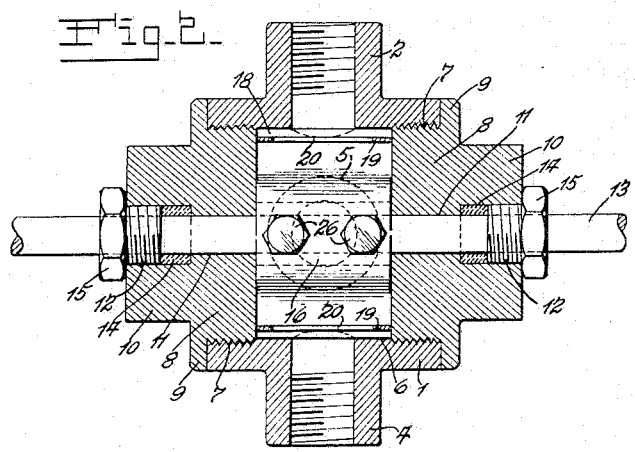
Inventor
Warner Stone Hilkey
by Rippey & Kingsland
His Attorneys.

Patented Dec. 5, 1933

1,938,425

UNITED STATES PATENT OFFICE 1,938,425

VALVE

Warner Stone Hilkey, St. Louis, Mo.

Application February 10, 1932. Serial No. 591,934

4 Claims. (Cl. 251—102)

This invention relates to improvements in valves; and consists in the novel construction hereinafter disclosed.

An object of the invention is to provide a valve in which the valve member is constructed and arranged to communicate two or more ports while maintaining other ports from the valve casing sealed, with particular provision for holding the valve member in sealed relation with the closed ports.

Another object of the invention is to provide a valve in which the valve member is oscillated or rotated to communicate ports from the valve casing and to seal other ports from the casing against pressure entering the valve casing either against the seal or in a direction opposite the seal.

Another object of the invention is to provide a valve having a cylindrical valve chamber and in which is mounted a semi-cylindrical valve member, with provision for adjusting the valve member to bring the surfaces of the valve member into close contact with the adjacent surfaces of the valve casing.

Additional advantages of the construction will be apparent from the following detailed description, taken in connection with the accompanying drawing, in which—

Fig. 1 is a side elevation of the valve assembly.

Fig. 2 is a longitudinal section taken substantially on the line 2—2 of Fig. 3.

Fig. 3 is a cross-section taken substantially on the line 3—3 of Fig. 1.

Fig. 4 is a perspective view of the valve member disassembled from the valve casing.

In the embodiment of the invention illustrated in the drawing, the construction is shown as including a substantially cylindrical valve casing 1 having a series of hollow bosses 2, 3, 4 and 5 integrally formed therewith and constituting at their inner ends ports that communicate with the valve chamber 6. These bosses may be internally threaded or otherwise constructed for connecting with conduits leading to or from the valve. The number of communications with the valve chamber may be varied according to the service to be performed by the valve, and it is not material to the invention as to the number or disposition of the inlets or outlets to the valve chamber.

The ends of the valve casing 1 are internally threaded at 7 to receive in threaded engagement the inner ends 8 of head members for the valve casing, said head members being provided with flanges 9 fitting over the outer edges of the valve casing and a polygonal portion 10 for engagement with a suitable tool for tightening and releasing the heads from the casing.

Each of the heads 10 is provided with an axial cylindrical opening 11 the outer ends of which are enlarged to provide packing glands 12. A shaft 13 extends through the openings in the heads and across the valve chamber 6 and is sealed in respect of the heads by a packing 14 seated in the packing glands 12 and held in position by packing nuts 15. The shaft may be turned to impart either an oscillating or a rotary motion thereto by any suitable means, depending upon the particular service for which the valve may be used. For example, where used as a stationary valve to control the flow of liquids, the shaft may be provided with a handle for manual manipulation; or, where the valve is used for the inlet and exhaust of gases, for example, in internal combustion engines, the shaft 13 may be driven to impart a rotary motion thereto by any suitable driving mechanism.

The valve member which is shown in detail in Fig. 4 comprises a central hub 16 having a bore 17 through the axis thereof oblong in cross-section. Extending from the hub on one side of the axis thereof is a semi-cylindrical body 18 designed to fit closely into the valve chamber 6. On the opposite side of the valve member is a spring frame comprising semicylindrical resilient arms 19 connected at their ends by plates 20. The frame is preferably of strong spring steel and is assembled with the valve member by insetting the edges of the plates 20 in grooves 21 formed in the flat face of the member 18. The hub 16 is provided with spaced openings 22 through the wall thereof, and the inner face of of the hub diametrically opposite the openings 22 is provided with recesses 23 that extend from the bore 17 into the valve body.

The valve body is mounted on the shaft 13 within the chamber 6 and is free to move diametrically of the shaft in the direction of the elongation of the bore 17. The shaft has threaded openings therethrough in alinement with the openings 22 and the recesses 23, and cross members including an intermediate threaded section 24, a reduced cylindrical section 25 at its inner end and a head 26 at its outer end serve to connect the valve body with the shaft. These screw members are threaded into the threaded openings in the shaft, the inner ends projecting into the recesses and the outer ends extending beyond the hub. A strong expansion spring 27 is assembled with each screw member intermediate the head and the face of the hub, the spring serving to move the semi-cylindrical portion of the valve body closely against its seat in the chamber 6. These springs also serve to prevent loosening of the screws during the operation of the valve. The resilient frame is pressed fitted into the chamber and tends to increase the resilient pressure of the valve body to its seat, as well as serving as a guide for the valve body, holding it evenly to its seat as the valve body is turned.

As a matter of convenience of assembly, the heads of the screw members are preferably located within the area below the outlet or inlet openings from the chamber 6, so that a tool may be inserted through the openings under which the heads of the screw members are positioned for adjusting the screw members in the assembly of the valve structure.

I am aware that the invention may be modified in certain particulars without departing from the spirit and scope of the invention. I do not limit myself, therefore, to the exact construction shown and described, but what I claim and desire to secure by Letters Patent is:—

1. In a valve, the combination of a valve casing having a cylindrical valve chamber therein, a plurality of passages communicating with said valve chamber arranged in spaced radial positions with respect to said chamber, a valve body seated within the chamber having a semi-cylindrical body fitting against the wall of said chamber and said valve body being provided with an elongated opening therein, a shaft extending through the opening in said valve body and extending exteriorly of the valve casing, screws threaded through the shaft and slidably connected with the valve body, and resilient means in connection with said screws tending to move the valve body against the wall of the valve chamber.

2. In a valve, the combination of a valve casing having a cylindrical valve chamber therein, a plurality of passages communicating with said valve chamber arranged in spaced radial positions with respect to said chamber, a valve body seated within the chamber having a semi-cylindrical body fitting against the wall of said chamber and said valve body being provided with an elongated opening therein, a shaft extending through the opening in said valve body and extending exteriorly of the valve casing, screws threaded through the shaft and slidably connected with the valve body, and expansion springs in connection with said screws adapted to press the valve body inwardly against the wall of the valve chamber.

3. In a valve, the combination of a valve casing having a cylindrical valve chamber therein, a plurality of passages communicating with said valve chamber arranged in spaced radial positions with respect to said chamber, a valve body seated within the chamber having a semi-cylindrical body fitting against the wall of said chamber and said valve body being provided with an elongated opening therein, a shaft extending through the opening in said valve body and extending exteriorly of the valve casing, screws threaded through the shaft and slidably connected with the valve body, and a resilient frame connected with said valve body and extending against the wall of the valve chamber on the side opposite to the bearing face of said valve body, said frame tending to press the valve body against the wall of the valve chamber and to constitute a guide for the valve body in its turning movement.

4. In a valve, the combination of a valve casing having a cylindrical valve chamber therein, a plurality of passages communicating with said valve chamber arranged in spaced radial position with respect to said chamber, a valve body seated within the chamber having a semi-cylindrical body fitting against the wall of said chamber and said valve body being provided with an elongated opening therein, a shaft extending through the opening in said valve body and extending exteriorly of the valve casing, screws threaded through the shaft and slidably connected with the valve body, expansion springs in connection with said screws adapted to press the valve body inwardly against the wall of the valve chamber, and a resilient frame connected with said valve body and extending against the wall of the valve chamber on the side opposite to the bearing face of said valve body, said frame tending to press the valve body against the wall of the valve chamber and to constitute a guide for the valve body in its turning movement.

WARNER STONE HILKEY.